United States Patent [19]

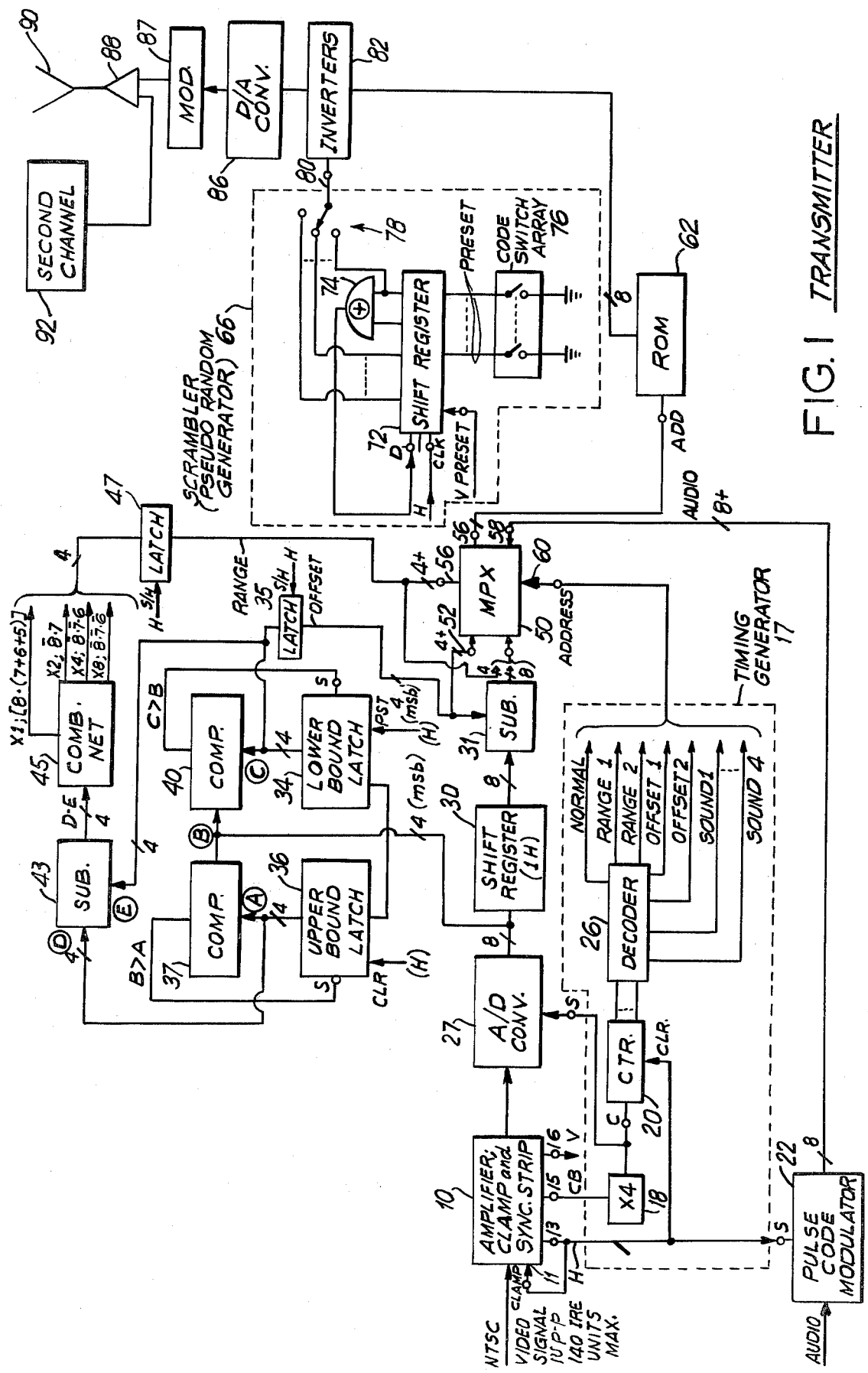
FIG. 1 TRANSMITTER

Sassler

[11] 4,318,126
[45] Mar. 2, 1982

[54] MULTIPLEXED VIDEO TRANSMISSION APPARATUS FOR SATELLITE COMMUNICATIONS

[76] Inventor: Marvin L. Sassler, 56 Palmer Dr., Wayne, N.J. 07470

[21] Appl. No.: 136,547

[22] Filed: Apr. 2, 1980

[51] Int. Cl.³ .............................................. H04N 7/04
[52] U.S. Cl. ..................................... 358/141; 358/263
[58] Field of Search ................. 358/83, 141, 142, 167, 358/166, 263

[56] References Cited

U.S. PATENT DOCUMENTS

| | | |
|---|---|---|
| 3,499,108 | 3/1970 | Simon . |
| 3,504,115 | 3/1970 | Suzuki et al. . |
| 3,648,178 | 3/1972 | Hershberg . |
| 3,743,765 | 7/1973 | Maier ................................... 358/263 |
| 3,980,809 | 9/1976 | Cook .................................... 358/263 |
| 3,991,266 | 11/1976 | Baer . |
| 4,191,968 | 3/1980 | Kirk, Jr. . |

OTHER PUBLICATIONS

*Thomson-CSF Laboratories Technical Bulletin*, "Digital Noise Reducer, Model 9000", 3-78.

*Primary Examiner*—Richard Murray
*Attorney, Agent, or Firm*—Stephen B. Judlowe

[57] ABSTRACT

Improved multiplexed communications apparatus distributes plural video signals via a single satellite transponder with enhanced reproduced quality, i.e., improved signal-to-noise ratio. The up-link transmitter delays each signal for one line period, and computes statistics characterizing the preceding subject line (e.g., minimum signal level and dynamic range) which are transmitted during the horizontal synchronizing pulse period. The transmitted video is then shifted in level and selectively amplified in accordance with the line statistics to more fully occupy the available transponder deviation allotted to the channel.

Following satellite frequency shifting and transponder re-broadcasting, the received, modified video is restored utilizing the sync-period transmitted information (minimum level/offset; range/scale factor). Each multiplexed received video signal thus exhibits a substantially enhanced signal-to-noise ratio vis-a-vis video information transmitted in unmodified form.

18 Claims, 3 Drawing Figures

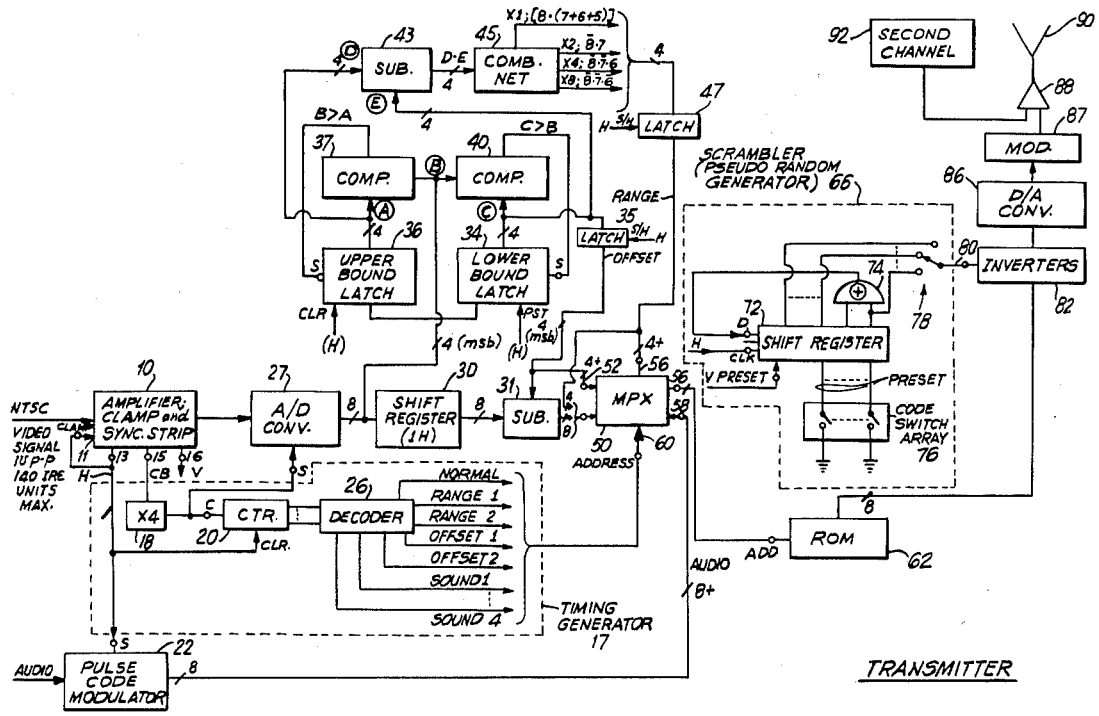

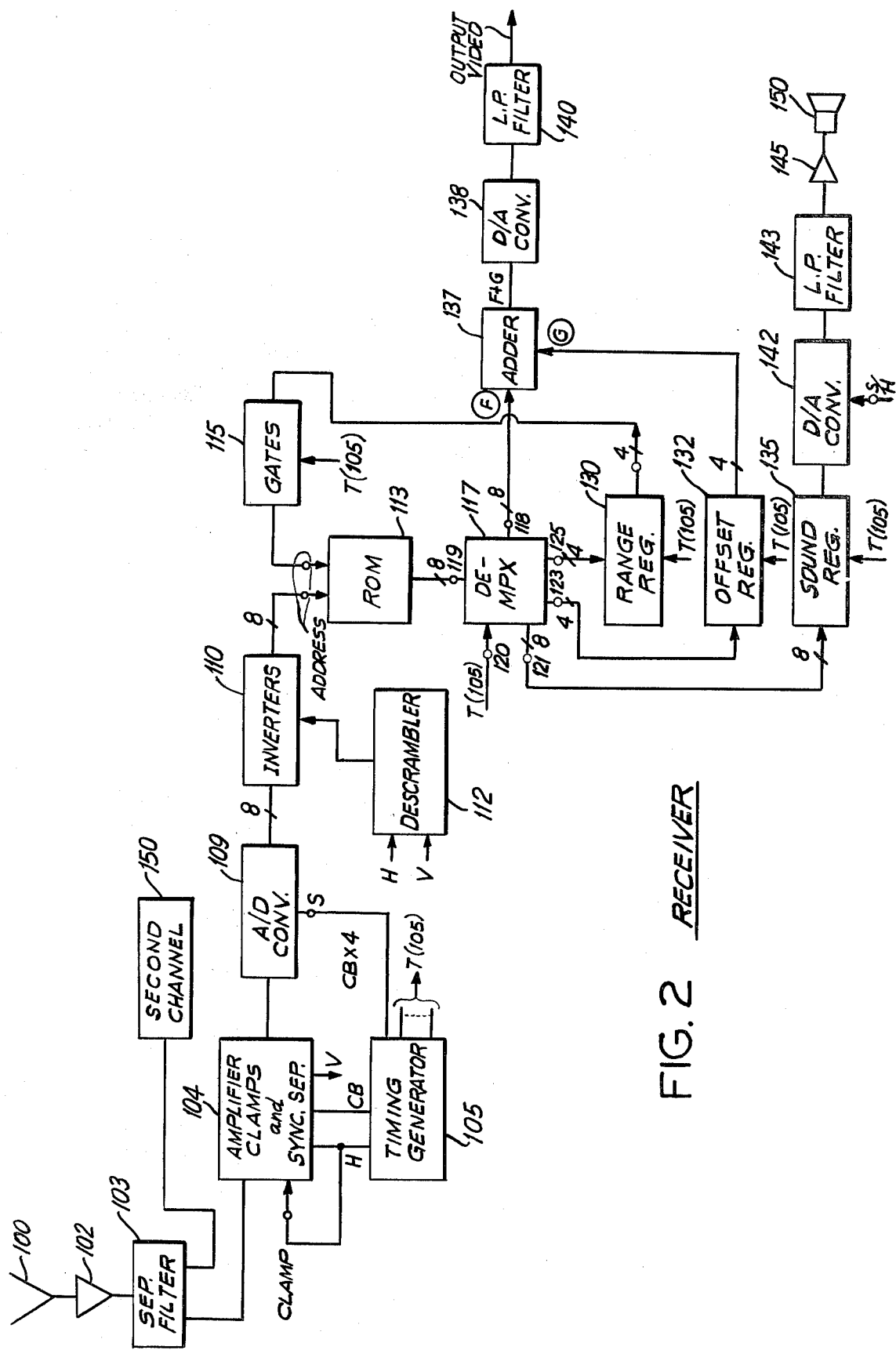
FIG. 2 RECEIVER

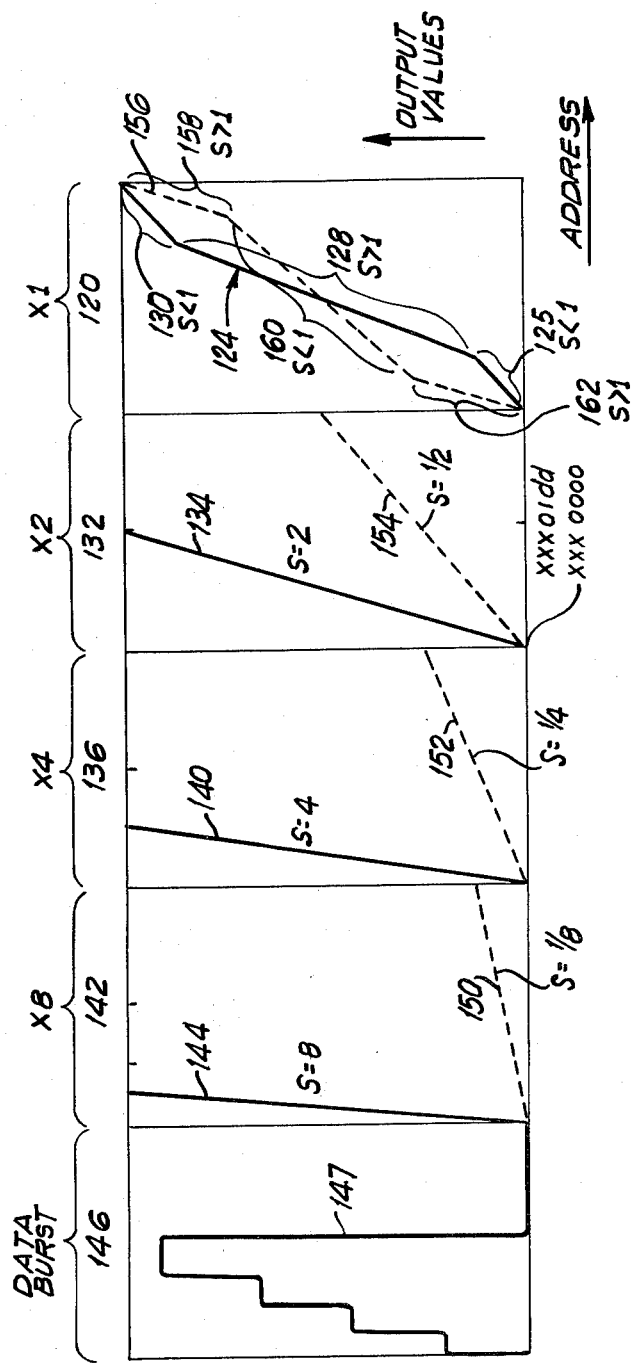
FIG. 3 MEMORY 62, 113

MULTIPLEXED VIDEO TRANSMISSION APPARATUS FOR SATELLITE COMMUNICATIONS

DISCLOSURE OF INVENTION

This invention relates to electronic communications systems and, more specifically, to an improved video communications system exhibiting improved signal-to-noise performance and which permits transmission of multiple composite video signals via a single satellite transponder.

One important present day television signal distribution mechanism is via synchronously orbiting communication satellites. Each satellite (of which there are and can be only a limited number) has a limited number of repeater transponders which receive up-link transmissions in the 6 Ghz frequency range, and retransmit the up-link intelligence about 4 Ghz. The information content processed by such satellites may be some or all of data, voice, video or the like. The rental tariffs for use of each transponder are substantial (presently approximating the $100,000 per month range)—and their availability is limited.

When applied in a video service, a full transponder has been required to transmit a single television signal with the desired quality—and this notwithstanding the approximately 6 mHz television signal and the over 30 mHz transponder band width. The basic difficulty is the limited output power available at the satellite traveling wave tube. This limits the down-link, repeated frequency modulated video signal carrier-to-noise ratio and thereby also the recovered signal-to-noise ratio. Thus, to satisfy signal clarity objectives, the entire frequency deviation of a transponder is utilized to re-radiate a single video transmission.

It is an object of the present invention to provide improved electronic communications apparatus.

More specifically, it is an object of the present invention to provide improved communications apparatus permitting multiplexed video carriage via a single communications channel.

The above and other objects of the present invention are realized in specific, illustrative multiplexed communications apparatus for distributing plural video signals via a single satellite transponder with acceptable reproduced quality, e.g., of network quality signal-to-noise ratio. The up-link transmitter delays each signal, and computes statistics of each subject line (e.g., minimum level and range) which are transmitted during the horizontal synchronizing pulse period. The transmitted video is then selectively amplified in accordance with line statistics (dynamic range) to more fully occupy the available transponder deviation allotted to the program.

Following satellite frequency shifting and transponder re-broadcasting, the received, modified video is restored utilizing the sync-period transmitted information (minimum level/offset; range/scale factor). Each multiplexed received video signal thus exhibits a substantially enhanced signal-to-noise ratio vis-a-vis video information transmitted in unmodified form.

The above and other features and advantages of the present invention will become more clear from the following detailed description of a specific, illustrative embodiment thereof, presented hereinbelow in conjunction with the accompanying drawing, in which:

FIG. 1 schematically depicts an up-link transmitter for an improved communication system in accordance with the present invention for multiplexing at least two information signals via a single repeater communications channel;

FIG. 2 schematically illustrates receiver apparatus for a received multiplexed signal which cooperates with the transmitter apparatus of FIG. 1; and FIG. 3 is a memory map characterizing read only memories (ROMs) 62 and 113 respectively contained in the transmitter and receiver apparatus of FIGS. 1 and 2 respectively.

Turning now to the drawing and FIG. 1 in particular, there is shown transmitter apparatus for transmitting at least two information signals, such as video, via a single communications channel, e.g., via a signal transponder in a communications satellite. For the assumed video service, each of the two signals are shifted in frequency and retransmitted by the communications satellite, and recovered by the receiver apparatus of FIG. 2 while exhibiting a signal-to-noise ratio of acceptable, e.g., network quality.

In accordance with the principles of the present invention, the format of the transmitted video information is altered in a manner which increases the received signal-to-noise ratio to an acceptable level for each of the plural multiplexed signals—for the two signals in the case of the arrangement shown in FIGS. 1 and 2 of the drawing. To this end and still in overview, a full line of video information to be transmitted is stored, processed, and modified before transmission. More particularly, a statistical property of the video line information (e.g., its minimum value) is measured. Determined also during this one line of video storage is the peak-to-peak variation in the picture level information content between the minimum and maximum values. During a full transmission cycle, the minimum line value is transmitted as a data word during the horizontal sync period.

During the normal line information portion of the video wave between horizontal synchronizing periods, the measured minimum line signal value is subtracted from the instantaneous video level to obtain a "variational" video signal. This variational information signal is expanded (i.e., amplified) in accordance with a selected one of a number of transfer characteristics ("scale factors") which may or may not be linear. That is, the variational information above the fixed minimum value is expanded to more nearly fully occupy the capacity of the information channel allotted to the subject signal. Since the noise associated with the video channel is fixed, this intelligence signal expansion acts to increase the signal-to-noise performance of the entire assembly.

Also transmitted during the synchronizing period between video lines is sampled audio information in a digital format; and the scale factor in use for the line information to be next sent which, in conjunction with the minimum value data, permits the receiver to reconstruct the original video information.

At the receiver, operations are effected to each video channel which are essentially the inverse of the video wave modifications performed at the transmitter. To this end, the video intelligence is reduced by an amount which is the inverse of the enhancement effected at the transmitter. This data reduction is controlled at the receiver by the scale factor transmitted during the preceding horizontal pulse period. Following reduction of the video line signal, the minimum video value which was subtracted out at the transmitter is reintroduced as an offset to the reconstituted variational information at the receiver. Also at the receiver, the sampled audio information is extracted from the data burst during the synchronizing period, and converted to its normal analog audio form via a per se well known digital-to-analog converter and low pass filter.

To further illustrate the principles above-discussed underlying the instant invention, consider the memory map for a read only memory (ROM) 62 included at the FIG. 1 transmitter which schematically has memory address along its abscissa and output value given by its vertical or ordinate axis. Consider, for example, the transfer characteristic 134 associated with the "times 2" scale factor portion 132 of the memory which obtains when the peak-to-peak signal variation during any line between the signal minimum and maximum values is between one-fourth and one-half of full scale. Under these conditions, without the principles of the present invention, a video wave would be sent which is wasteful of the channel band width capacity since the ability to resolve the video line information content between horizontal synchronizing pulses would make use of less than one-half of the channel communications capacity, and possibly only as little as one-fourth of the capacity. Correspondingly, after signal intelligence-bearing enhancement of the instant invention, the actual information content is enhanced by a factor of two to now occupy between one-half and the entire channel capacity. Similarly, the line level signal variation content is multiplied by a factor of four (transfer characteristic of 140 in memory area 136) when the variation content between video signal minimum and maximum values is between one-eighth and one-fourth of the maximum permissible bounds therefor; and multiplied by a factor of eight when the variation is between one-sixteenth and one-eighth of full scale. This may, of course, be extended with additional scale factors if desired by simply employing a larger memory capacity than that shown in FIG. 3.

As above noted, an inverse, signal reduction operation is accomplished at the receiver. A read only memory (ROM) 113 at the receiver stores a series of inverse scale factor transformation characteristics (shown by the dashed lines in FIG. 3). Thus, for example, where the scale factor "2" is employed and communicated to the receiver during a preceding horizontal synchronizing interval, the transfer characteristic 154 is selected to decrease the video signal variation by a scale factor of one-half. Thus, the produce of the scale factors at the transmitter ($\times 2$) and at the receiver ($\times 0.5$) equal unity such that at the output of the receiver the video variation is restored to its normal size. It is observed, however, that at the receiver the channel noise is similarly reduced by the one-half transfer factor 154. Accordingly, a very substantial improvement in signal-to-noise is realized through the expansion/compression principles of the invention. This improvement factor corresponds to the scale factor at the transmitter and may be arbitrarily large depending upon the capacity of the memory employed.

The unity scale factor area 120 (solid line curve 124—FIG. 3) is employed at the transmitter when the peak-to-peak signal variations exceed one-half of full scale during any single horizontal line trace. The solid line curve is broken into two sub-unity or compression signal ranges 125 and 130 near the bounds therefor where information distinction is less important; and a greater than unity or expansion area 128 where enchanced information content will improve picture resolution and quality. At the receiver the dashed curve 156 having ranges 158, 160, and 162 is utilized to effect inverse operations.

With the above general principles in mind, attention will now be directed to FIG. 1 comprising specific illustrative transmitter apparatus for effecting the improved transmission generally discussed above. A standard NTSC video signal is supplied to the input of amplifier, clamping and sync stripping circuitry 10 per se well known to those skilled in the art and amenable to discrete or integrated circuit fabrication. The amplifier 10 amplifies the input composite video signal, employing automatic gain control to provide an output signal of prescribed, known absolute voltage value. This is typically effected by using the horizontal sync pulse amplitude as the feedback loop controlled variable.

Circuitry 10 strips off from the incoming wave the horizontal synchronizing pulses which are supplied at an output terminal 13; vertical synchronizing pulses present at an output port 16; and the color burst present at an output 15. The color burst output is employed to synchronize a frequency multiplier 18 (e.g., with a four multiple)—such as a gated or synchronized oscillator, whose output is used as a sampling and control signal for purposes below discussed. The horizontal pulses are internally employed in circuitry 10 to clamp the back porch as is per se well known and commonly done in the art.

The output video information from circuitry 10 is converted to digital form in an analog-to-digital converter 27, which samples the incoming analog video wave at four times the color burst frequency under control of the output of synchronized oscillator 18. It is assumed for purposes of illustration only that the analog-to-digital converter 27 supplies eight data bits which quantize the value of the video voltage wave obtaining during the last sampling output pulse from oscillator 18. The sampled digital video information is supplied to a shift register 30 which is at least one horizontal line long, i.e., which has sufficient capacity to store within it an entire horizontal line of sampled information for the video signal. Shifting for the unit 30 may be from an external clock, its own internal clock or, alternatively, from a delayed output from the oscillator 18. It is the purpose of the shift register 30 to delay the video information being transmitted by one line (1H) to permit examination of each line of information prior to its transmission. Thus in accordance with the general discussion above, the minimum value for the information content of the video wave is determined while the line samples are being loaded in the shift register 30. Also determined is the maximum-to-minimum line video variation to select and implement the scale enhancement factor at which the line will be transmitted.

For purposes of transmitter timing, and to subdivide a cycle of operation for processing each video line of information into its constituent functional parts, the output of the oscillator 18 in an overall timing generator 17 circuit combination is supplied to the count input of a counter 20 which is cleared once each line at the inception thereof by the horizontal line synchronizing pulse output of circuitry 10. The output of counter 20 passes to a decoder 26 which decodes predetermined states of the counter 20 to provide the indicated output timing control signals at various times and for various functional purposes during the composite one line (1H) interval for purposes herein discussed. Various implementations of the decoder 26 are well known per se to those skilled in the art and may comprise, for example, integrated circuit combinatorial logic, coincidence gates, or the like. In particular, near the beginning of a composite line period during the horizontal sync pulse period, RANGE 1 and RANGE 2 control signals are generated during two sequential time periods to define the period when two two-bit words defining the scale factor (FIG. 3 memory portion identification) with which the line will be transmitted. This is followed by two periods, OFFSET 1 and OFFSET 2 when two two-bit words providing the minimum line video level is transmitted during the horizontal sync interval. Finally also during the horizontal sync period, four SOUND-1 through SOUND-4 periods correspond to pulse code modulated transmissions of sampled program audio. All of this information is readily transmitted during the middle portion of the horizontal synchronizing pulse period. Other than at such times, the decoder energizes the NORMAL output timing control lead such that the processed video wave itself becomes the signal selected for transmission by the channel.

As above noted, prior to transmission of each line, its minimum value and its range or peak-to-peak variation relative to the minimum value must be determined. To this end, lower and upper bound registers or latches 34 and 36 are respectively preset (all binary "1" states) and cleared (all "0's") by the horizontal sync pulses at the beginning of each line. Thereafter, as each sampled level of the video intelligence is present at the output of the analog-to-digital converter 27, it is compared in an upper bound comparator 37 and a lower bound comparator 40 with the previously stored contents in latch 36 and 34 (provisional maximum and minimum line video levels). If the comparator 37 determines that the present video signal sample is larger than the previously largest stored signal in latch 36, it drives the latch 36 into the sampling mode to load latch 36 with the output of converter 27. Thus, it will be apparent that when all of the outputs of analog-to-digital converter 27 are encountered during the course of an entire video line intelligence wave, latch 36 will contain the largest encountered level of the video level.

Similarly, latch 34 is loaded with the then obtaining output of the converter 27 if the converter supplies a value which is less than that previously stored therein. Accordingly, again when video intelligence of any line has been completed, latch 34 has stored therein the smallest value of the video wave at any point during the preceding line. For convenience, the illustrated circuitry measuring maximum and minimum line values as well as the signal range or scale factor is effected with four bit processing for the four most significant bits of the output of the analog-to-digital converter 27. It is apparent that any other number of digits may be employed as well if desired.

The information stored in the lower bound latch 34 at the conclusion of the video intelligence for the video line last encountered is per se the OFFSET value, i.e., the digital word characterizing the lowest level of the wave. Thus, this offset factor at the output of latch 34 is supplied via a data preserving latch or register 35 as one input 52 to a multiplexer 50 for selection during the OFFSET-1 and OFFSET-2 time transmission periods. For convenience, di-bit encoding is employed for transmission of the offset data, and thus the two distinct sequential time periods OFFSET-1 and OFFSET-2 are employed during which times the two most significant and two least significant bits of the offset value are sequentially sent. The data burst portion 146 of memory 62 is employed for such transmission—and is shown as providing the four possible di-bit output levels (transfer characteristic 147). Any other form of digital encoding and transmission may alternatively be employed.

The OFFSET word is also supplied to a digital substractor 31 which subtracts this value from the sampled, digitally stored line video information as the samples emerge from the shift register 30 after the one line delay. As above noted, by subtracting out this minimum value which by itself bears no intelligence once that level is communicated to the receiver, the full capacity of the transmission channel may be utilized for transmission of the level-enhanced data-bearing information thus improving transmission quality.

To compute the scale factor or range, the maximum and minimum video values during the line respectively stored in the upper and lower bound latches 36 and 34 are supplied to a digital subtractor 43. The output of the subtractor 43 is thus a four bit digital word which characterizes the difference between the signal maximum and minimum values—which is its range. This range is examined by a combinatorial network 45 to determine whether or not the range is between one-half and full scale for the permissible video intelligence variation (upper output lead of combinatorial network 45 energized); between one-quarter and one-half of full scale in which event the "×2" or second line is energized; and so forth. Particular combinatorial logic is shown in FIG. 1 for each output of network 45, the numbers "8", "7", "6" and "5" being respectively the four most significant digit output leads for the maximum-minimum line level difference output of subtractor 43. Some reflection will show, for example, that the variation signal is greater than one-half of full scale (×1 upper signal lead activated) if the most significant "8" bit output of subtractor 43 is a "1" and at least one of the other signals "7", "6", or "5" is also a binary "1". Similarly, the variation signal will be between one-quarter and one-half ("×2" scale factor chosen) if the most significant "8" bit is a zero and the second most significant bit "7" is a one. The patterns for the remaining scale factors are similarly presented in the drawing. The signals on output leads from the combinatory network 45, loaded into a register or latch 47, thus define which scale factor is to be employed during any subject video line transmission cycle. As above described, this in turn depends on the peak-to-peak or dynamic range of the signal between its upper and lower video levels.

The various signals to be transmitted during the several points in a composite video line transmission cycle of operation are supplied to input ports of the multiplexer 50. The address or input selector input 60 of the multiplexer is controlled by the output of the timing generator 17, i.e., the outputs of the decoder 26, such that a proper multiplier input port is selected from time to time throughout the cycle in accordance with the information then to be transmitted. To characterize a composite transmission cycle above described, during an early portion of the synchronizing pulse interval, the RANGE 1 and RANGE 2 output leads of decoder 26 are sequentially enabled to pass the scale factor (RANGE) output of combinatorial network 45 (residing in latch 47) through multiplexer 50 to ROM 62 via the multiplexer output port 56. In accordance with the di-bit encoding transmission above discussed, two appropriate output levels from the data burst portion 146 of the memory are read out from ROM 62 seriatum.

More particularly, the two bits present at the multiplexer 56 output during each of the RANGE 1 and RANGE 2 periods define one of four output data levels during each transmission period, the memory portion 146 and its four-state transfer characteristic 147 being identified by the absence of further addressing information in the most significant memory 62 address input digit positions. This output from the read only memory 62, corresponding to the scale factor, selectively passes through an inverter array 82 for encription purposes below discussed, a digital-to-analog converter 86 where the digital information is converted to analog form, and a modulator 87. For the satellite transmission context of the instant invention, modulator 87 frequency deviates a carrier in accordance with the analog output of converter 86. From the output of modulator 87, the frequency modulated carrier passes through a combining amplifier 88 to an outgoing signal radiating antenna 90. Also connected as an input to the combining amplifier 88 is the output of a second channel 92 which effectively duplicates the apparatus otherwise shown in FIG. 1 to distribute at least two video signals multiplexed via the common satellite transponder.

Following RANGE transmission above discussed and also during the horizontal synchronizing period, the next following OFFSET 1 and OFFSET 2 control signals from timing 17 sequentially pass the di-bit encoding OFFSET value present at the output of lower bound latch 34 (stored in latch 35), connected to the multiplexer input 52, to the read only memory 62 for output transmission. This is followed by the four di-bit transmission sequences SOUND 1 through SOUND 4 for the audio program corresponding to the video information supplied to the amplifier 10. The audio digital information is produced by simply sampling incoming audio intelligence at the beginning of the horizontal sync interval in a pulse code modulator 22, the 8-bit encoded sound sample being supplied to an input 58 of the multiplexer 50. These 8-bits are selected two at a time under control of the SOUND 1 through SOUND 4 signals, and transmitted on the di-bit basis, all such information being read out from the memory area 146 and radiated by the circuitry 82, 86, 87, 88 and 90 in the manner above discussed.

Following transmission of the statistical scale factor (RANGE), OFFSET level, and sound sample during the horizontal synchronizing period, the NORMAL output of decoder 26 causes the actual video line information to be transmitted during the bulk of the 1H time period. That is, the output of subtractor 31 and the latch 47 (4-bit scale factor output of combinatorial network 45) are passed from input 51 of the multiplexer to the addressing input of the read only memory 62. Again, the eight output digits of the subtractor 31 during this video line interval will comprise the actual video signal level encountered, less the OFFSET or minimum signal level output of the lower bound latch 34 as preserved in latch 35. Thus, the video digital information output of subtractor 31 comprises only the variational signal above the minimum level.

The scale factor digits passing through the multiplexer 52, comprising the latch 47-preserved output of combinatorial network 45 select the appropriate one of the amplification or scale factor curves 124, 134, 140 or 144 to be employed for the subject transmission cycle. That is, these four most significant bit inputs to the multiplexer input port 51 passed to the read only memory 62 addressing input select one of the read only memory 62 portions 120, 132, 136, or 142 depending upon the line variational content. Once a particular memory band is selected by the four bit output of network 45, the particular output information from read only memory 62 depends only on the incremental or variational 8-bit output of subtractor 31 then appearing at the least significant addressing input port of read only memory 62 as above discussed. Accordingly, the output signal from read only memory 62 is given by the selected one of the interval characteristics 124, 134, 140 or 144 depending upon the then obtaining signal level; but which represents (other than for the end portions 125 and 130 of scale factor 124), an enhanced relative signal variation vis-a-vis the relative level variation output of the subtractor 31.

As above described, each 8-bit video sample output of read only memory 62 (amplified in value other than when the characteristics 125 or 130 obtains), is selectively inverted in encripting inverters 82, converted to analog form in converter 86, frequency modulates a carrier in modulator 87; amplified in amplifier 88; and radiated at antenna 90. The same condition obtains for whatever signal is being supplied by the second channel 92, the 30-plus megacycle satellite transponder channel band width simply being apportioned between the two programs (or apportioned among more than two programs if such are utilized, as they may be). Accordingly and in summary, the video information is for the vast majority of cases transmitted in amplified form to more fully occupy the video channel capacity with information content, while the scale factor, OFFSET value and audio program information are transmitted during the horizontal synchronizing pulse interval.

In accordance with one aspect of the present invention, encription is provided such that the signal radiated by the composite transmitter apparatus of FIG. 1 may be recovered only by those equipped receiving stations authorized to effect such recovery. That is, the television program generated in the FIG. 1 apparatus is denied to those possessing signal recovery equipment; but who are not authorized to receive the signal. In overall scope, this is effected using the inverter array 82 which selectively invert all outgoing information on a line by line basis in accordance with the settings of switches 76 and 78 included in a transmitter pseudo random generator (scrambler) 66. Only those receivers having a like random generator with switches corresponding to elements 76 and 80 set to like positions for effecting a like selective line re-inversion will receive the signal in a reconstituted polarity capable of recovery. To this end, pseudo random generator (scrambler) 66 selectively drives the control inputs of inverters 82. The inverters may simply comprise a series of Exclusive-OR gates each having one input connected to a corresponding output of the read only memory 62, and a second input connected in common to the output of switch 78, i.e., to the generator output lead 80. Illustrative circuitry for generator 66 is per se well known and employs a shift register 72 having selected of its outputs connected as inputs to an Exclusive-OR gate 74, the output of which drives the data input of the shift register 72. The horizontal sync pulses are supplied as a clock input to shift register 72. The shift register 72 is preset once each vertical blanking period with an input corresponding to the setting of the array of switches 76. It will be recalled that for current sinking logic, a closed one of the switches 76 connected to ground will be interpreted as a binary zero while an open switch will represent a binary one. Thus, any pattern of open/closed switches of the array 76 which will give rise to a unique preset code entered as a starting state into shift register 76 during the vertical synchronizing pulse interval.

As the horizontal pulse inputs to the Exclusive-OR gate 70 are encountered, a different digital pattern arises at the output of the several shift register stages, which pattern also depends upon the preset word. A bit pattern, i.e., a particular output of a shift register 72 stage is selected by switch 78 and used as the inverting/non-inverting control signal for the inverter array 82. Accordingly, the output transmission for the transmitter will depend upon the setting of the switches 76 and 78. Thus, only those receiving stations which can emulate the inverter 82 inverting/non-inverting pattern will be capable of receiving the transmitted information.

Receiver apparatus for the instant invention is shown in FIG. 2. As above noted, the receiver apparatus effects operations which are the electronic inverse of those performed at the FIG. 1 transmitter. The signals radiated by the transmitter antenna 90 are received, frequency shifted and re-radiated by the satelite transponder, and recovered by the receiver antenna 100 and broad band amplifier 102. A separation filter 103 separates the several channels, the second channel information being passed to circuitry 150 for second channel recovery. The second channel circuitry 150 essentially replicates that shown in the remainder of FIG. 2 and will not be discussed further.

The received signal passes through an amplifier, clamp, and sync separator circuit 104 which corresponds to and effects operations similar to that of circuitry 10 at the transmitter. Similarly, a timing generator 105 provides output timing signals corresponding to those provided by the timing generator 17 at the transmitter. An analog-to-digital converter 109 digitizes the received video information, and regenerates the signal corresponding to that obtaining between the inverter 82 and converter 86 at the transmitter. A descrambler 112 replicates the pseudo random generator 66 at the transmitter and cooperates with an inverter array 110 to selectively invert the transmitter-inverted signal such that the output of the inverter array 110 corresponds to the signal pattern present at the output of read only memory 62 and the input of inverters 82 at the transmitter.

During the synchronizing pulse interval, the RANGE scale factor, OFFSET minimum level, and audio di-bit encodings produce a sequence of two-bit outputs from the receiver read only memory 113. These signals are applied to demultiplexer 117 input port 119 and, under the appropriate RANGE, OFFSET and SOUND control signals (collectively denoted T(105) from the output of timing generator 105 corresponding to circuitry 17 at the transmitter), pass to demultiplexer 117 output ports 125, 123, and 121, respectively. During the time when the scale factor for the incoming signal is being processed by the demultiplexer 117, RANGE timing is activated by timing generator 105, and a RANGE register 130 is enabled by the RANGE timing signals such that the RANGE information present at multiplexer port 125 is loaded into the RANGE register. Similarly, the four bit OFFSET or minimum video level value is loaded into OFFSET register 132 during OFFSET timing; and the eight sound bits are sequentially loaded two at a time into an eight bit sound register 135 during the SOUND 1 through SOUND 4 receiver intervals.

The sound or audio program is reconstituted in a per se well known manner. That is, the eight sound bits transmitted once each horizontal synchronizing period are converted to analog form by a digital-to-analog converter 142, smoothed by a low pass filter 143, amplified by an amplifier 145, and connected to a loud speaker 150 for reproduction.

During the normal video line information major portion of a 1H cycle, the incoming video information appears at the output of the inverter 110 and forms the least significant address input to the read only memory 110. The RANGE scale factor, stored in the RANGE register 130, passes through gates 115 under system timing control. The RANGE signal selects which of the characteristics 156, 154, 152 or 150 in the memory portions 120, 132, 136 and 142 will be employed during line video reception. That is, the RANGE signal in connected as the most significant addressing input digits to the read only memory 113. The selected characteristic as above described, will be the inverse of the enhancement characteristic employed at the transmitter, this occurring automatically since the same scale factor is used to select the corresponding portions of the read only memories 62 and 113 at the transmitter and receiver, respectively.

To reconstitute the video information, the reduced value output of the read only memory 113 is selected by the control, timing signal and passes through multiplexer 117 to a first input of an adder circuit 137. Also supplied to the adder 137 is the minimum video level or OFFSET value stored in the register 132. The output of the adder 137 thus is a fully reconstituted digitized video wave having the minimum value as well as the de-enhanced video variational information reformed by the output of the read only memory 113. The output of adder 137 thus corresponds to the input of subtractor 31 at the transmitter. The video output is restored to analog form in a digital-to-analog converter 138 (corresponding to the input of analog-to-digital converter 27 at the transmitter), smoothed by a low pass filter 140 and delivered as the resultant output video to any utilization means, distribution channel, or the like.

The receiver has thus been shown to effect operations which are the inverse of those effected by the transmitter apparatus. Further, the entire ensemble of the transmitter-receiver structure permits multiple use of a single transponder by increasing the signal-to-noise ratio of each of plural transmitted video waves collectively sharing the available frequency band width of the transponder. The channel signal-to-noise improvement obtains since the minimum value does not consume intelligence band width but, rather, is transmitted as a digital level during the horizontal synchronizing period; and the full channel allotted to an amplified (at the transmitter) and receiver-restored replica of the transmitted information.

The above described arrangement is merely illustrative of the principles of the present invention. Numerous variations and modifications thereof will be readily apparent to those skilled in the art without departing from the spirit and scope of the instant invention. Thus, for example, the FIG. 1—FIG. 2 apparatus thus subtracted out the minimum value of the signal as an OFFSET item to be transmitted during the horizontal synchronizing period. Any statistic characterizing the wave over the measuring period (1H assumed above) will suffice, such as the average line value, maximum line value, or the like. Accordingly, any statistic characterizing the value over the measuring period may be employed without departing from the principles of the present invention.

Moreover, the above analysis and embodiments have treated the statistical property determined for a line of video information to be a constant, e.g., a minimum value. Further advantages of the instant invention obtain by storing in memory a number of predetermined line patterns. The line video before delay at the output of analog-to-digital converter 27 is then compared with the stored information on some statistical basis, e.g., least squares, such that the predetermined line video pattern which best characterizes the subject line is selected for use. Thereafter, the variations of the incoming video are generated not with respect to a fixed value such as a minimum level as above-described, but to the varying standard of the selected best predetermined pattern. Such an arrangement permits yet further signal expansion, the identity of the pre-selected pattern, of course, being transmitted as digital information during the horizontal synchronizing pulse period.

What is claimed is:

1. In combination in video wave communications apparatus, cooperating transmitter and receiver means; said transmitter means including means for delaying a video wave being processed over a predetermined interval; means for determining a statistical level of the video wave characterizing said wave over said period, means for determining the maximum variation of said video signal level from said statistical level over said period, means for delaying the video wave for at least said period of time, means connected to the output of said delaying means for subtracting from said output video wave said statistical level determined by said statistical level determining means for creating a variation content signal, variable amplification means comprising a first read only memory connected to said subtracting means for amplifying said variation content signal by a scale factor dependent upon the output of said maximum variation determining means, and means for transmitting said statistical level, said scale factor and said amplified variation content signal; said receiver means comprising means for receiving said transmitted statistical level, scale factor and amplified variation content signal, variable reducing means comprising a second read only memory for selectively reducing said variation content signal dependent upon said received scale factor, means for combining said reduced variation signal and said received statistical level to thereby reconstitute the video wave.

2. A combination as in claim 1, wherein said first read only memory comprises plural memory sections each addressed by said scale factor, each of said memory sections including a transfer characteristic between the memory address inputs and output signal values which enhances the input address signal levels in at least a substantial part of said memory sections; and wherein said second read only memory comprises plural sections in one to one correspondence with said sections of said transmitter read only memory, each of said second read only memory sections comprising transfer characteristics which are the substantial inverse of those obtaining in a corresponding section of said transmitter first read only memory.

3. A combination as in claim 1, wherein said transmitter means further comprises first inverter means, including a control port, connected to the output of said first read only memory, and first pseudo random generator means connected to said control port of said first inverter means; and wherein said receiver means further comprises second inverter means, including a control port, connected to an address input of said second read only memory, and a second pseudo random generator means connected to said control port of said second inverter means.

4. A combination as in claim 3, wherein said first and second pseudo random generator means each comprises shift register means and Exclusive OR logic means connected selected outputs of said shift register means with the input thereof.

5. A combination as in claim 4, further comprising security encoding means, said shift register included in each of said pseudo random generators including preset input ports, said security encoding means comprising means for entering an adjustable digital pattern into said shift register input ports.

6. A combination as in claim 4 or 5, further comprising encoding switch means for connecting a selected output of said pseudo random generator shift register with said control port of said inverter means.

7. A combination as in claim 1, wherein said delaying means in said transmitter means includes shift register means.

8. A combination as in claim 1, wherein said transmitter and receiver means each includes timing means including color burst frequency multiplying means.

9. A combination as in claim 1, wherein said statistical level determining means comprises latch means for storing a provisional statistical level signal, and comparator means connected to said latch for receiving the video wave being processed for selectively updating the contents of said latch means.

10. A combination as in claim 1, wherein said maximum level determining means comprises an analog-to-digital converter for converting the video being processed to digital form, upper and lower bound latches, means for presetting said upper and lower latches to a level higher and less than the extreme bounds of the video wave being processed respectively, and first and second comparators each connected to the output of said analog-to-digital converter and respectively connected to said upper and lower bound latches for selectively varying the contents of said latch connected thereto.

11. A combination as in claim 10, further comprising subtractor means connected to the outputs of said upper and lower bound latches, and further comprising scale factor determining means connected to the output of said subtractor means.

12. A combination as in claim 3, wherein said transmitter means further comprises an analog-to-digital converter connected to the input of said delaying means, a digital analog converter connected to the output of said transmitter inverting means, a modulator connected to the output of said digital analog converter, additional channel signal supplying means, and combining amplifier means having inputs connected to the output of said modulator and to said second channel supplying means.

13. A combination as in claim 3, wherein said receiver means further comprises a demultiplexer having an input connected to the output of said second read only memory, range register means and offset register means respectively loaded with said received scale factor and statistical level signal received by said receiver means, and further comprising adder means for adding the contents of said offset register means and the reduced video signal reduced at the output of said second read only memory.

14. A combination as in claim 13, further comprising digital-to-analog converting and low pass filter means connected to the output of said adder means.

15. A combination as in claim 1, wherein said transmitter comprises multiplexing means having an output connected to the input of said first read only memory, a first input connected to the output of said subtracting means, a second input for receiving said scale factor, a third input connected to said statistical level determining means and a fourth input, and a pulse code modulator having an output connected to said fourth multiplexer input for supplying thereto a digitized audio program corresponding to the video wave being processed.

16. In combination in video wave receiving apparatus for receiving a video wave transmission comprising a scale factor, statistical video level over a predetermined period, and a variation content signal comprising the difference between the video level and said statistical level selectively amplified in accordance with said transmitted scale factor, said video wave receiving apparatus comprising means for receiving said scale factor, statistical video level and variation content signal, means comprising a read only memory having plural memory sections each storing a different transfer characteristic and an addressing input port connected to said received variation content signal for selectively reducing said variation content signal depending upon said received scale factor, means for combining said reduced variation signal and said received statistical level to thereby reconstitute the video wave.

17. A combination as in claim 16, wherein said transmitted information is selectively inverted, said receiving means further comprising inverter means including a control port connected to said addressing input of said read only memory, and pseudo random generator means having an output connected to said control port of said inverter means.

18. A combination as in claim 16, wherein said statistical video level comprises a selected one of a plurality of predetermined, stored, video line patterns, wherein said video wave transmission includes a signal identifying the specific one of said predetermined patterns used during the last line video transmission, and wherein said video wave receiving apparatus includes means for recovering said line pattern signal, and means for reconstituting the video information employing said characteristic pattern.

* * * * *